US012503962B2

(12) United States Patent
Thomas et al.

(10) Patent No.: US 12,503,962 B2
(45) Date of Patent: *Dec. 23, 2025

(54) METHOD AND APPARATUS FOR CERAMIC MATRIX COMPOSITE TURBINE SHROUD ASSEMBLY

(71) Applicants: Rolls-Royce Corporation, Indianapolis, IN (US); Rolls-Royce High Temperature Composites Inc., Cypress, CA (US)

(72) Inventors: David J. Thomas, Indianapolis, IN (US); Christopher Downie, Cypress, CA (US); Aaron D. Sippel, Indianapolis, IN (US); Ted J. Freeman, Indianapolis, IN (US); Clark Snyder, Indianapolis, IN (US)

(73) Assignees: Rolls-Royce Corporation, Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/974,674

(22) Filed: Dec. 9, 2024

(65) Prior Publication Data

US 2025/0179937 A1     Jun. 5, 2025

Related U.S. Application Data

(63) Continuation of application No. 18/528,739, filed on Dec. 4, 2023, now Pat. No. 12,188,365.

(51) Int. Cl.
*F01D 11/12*     (2006.01)
*F01D 25/00*     (2006.01)
(Continued)

(52) U.S. Cl.
CPC .......... *F01D 25/246* (2013.01); *F01D 11/122* (2013.01); *F01D 25/005* (2013.01);
(Continued)

(58) Field of Classification Search
CPC ........ F01D 11/08; F01D 11/12; F01D 11/122; F01D 11/125; F01D 25/246;
(Continued)

(56) References Cited

U.S. PATENT DOCUMENTS 5,705,231 A * 1/1998 Nissley .................... C23C 4/02
427/454
7,207,771 B2    4/2007 Synnott et al.
(Continued)

FOREIGN PATENT DOCUMENTS

EP    1965031 A2    9/2008
EP    3543468 A1    9/2019
FR    3056636 A1    3/2018

*Primary Examiner* — Courtney D Heinle
*Assistant Examiner* — Behnoush Haghighian
(74) *Attorney, Agent, or Firm* — Barnes & Thornburg

(57) ABSTRACT

A turbine shroud assembly adapted for use with a gas turbine engine includes a shroud segment. The shroud segment includes a heat shield, an attachment flange, and a multi-layer coating. The heat shield extends circumferentially partway around the axis to define a portion of gas path for the gas turbine engine. The attachment feature extends radially outward from the heat shield. The multi-layer coating is applied to different surfaces of the heat shield and the attachment feature of the shroud segment.

15 Claims, 5 Drawing Sheets

(51) Int. Cl.
*F01D 25/24* (2006.01)
*F01D 5/28* (2006.01)

(52) U.S. Cl.
CPC .......... *F01D 5/288* (2013.01); *F05D 2240/15* (2013.01); *F05D 2300/6033* (2013.01); *F05D 2300/611* (2013.01)

(58) Field of Classification Search
CPC .... F01D 25/282; F01D 25/284; F01D 25/286; F01D 25/288; F05D 2240/11; F05D 2230/90
See application file for complete search history.

(56) References Cited

U.S. PATENT DOCUMENTS

| | | | |
|---|---|---|---|
| 7,217,089 B2 | 5/2007 | Durocher et al. | |
| 7,374,395 B2 | 5/2008 | Durocher et al. | |
| 7,513,740 B1 | 4/2009 | Hervy et al. | |
| 7,600,967 B2 | 10/2009 | Pezzetti, Jr. et al. | |
| 7,771,159 B2 | 8/2010 | Johnson et al. | |
| 7,901,186 B2 | 3/2011 | Cornett et al. | |
| 8,124,252 B2 * | 2/2012 | Cybulsky | C23C 30/00 428/701 |
| 8,206,087 B2 | 6/2012 | Campbell et al. | |
| 8,303,245 B2 | 11/2012 | Foster et al. | |
| 8,641,371 B2 | 2/2014 | Nakamura et al. | |
| 8,651,497 B2 | 2/2014 | Tholen et al. | |
| 8,658,255 B2 * | 2/2014 | Kirby | C23C 28/042 427/255.18 |
| 8,684,680 B2 | 4/2014 | Martin et al. | |
| 8,784,041 B2 | 7/2014 | Durocher et al. | |
| 8,845,285 B2 | 9/2014 | Weber et al. | |
| 8,905,708 B2 | 12/2014 | Weber et al. | |
| 9,079,245 B2 | 7/2015 | Durocher et al. | |
| 9,447,503 B2 * | 9/2016 | Tholen | C04B 35/64 |
| 9,534,500 B2 | 1/2017 | Bouchard et al. | |
| 9,677,167 B2 * | 6/2017 | Bochiechio | C23C 28/3455 |
| 9,708,922 B1 | 7/2017 | Davis et al. | |
| 9,713,912 B2 * | 7/2017 | Lee | C23C 28/3455 |
| 9,714,578 B2 * | 7/2017 | Kirby | F01D 25/08 |
| 9,714,580 B2 | 7/2017 | Slavens et al. | |
| 9,745,854 B2 | 8/2017 | Baldiga et al. | |
| 9,759,079 B2 | 9/2017 | Sippel et al. | |
| 9,834,835 B2 * | 12/2017 | Strock | C23C 4/11 |
| 9,863,265 B2 | 1/2018 | Stapleton | |
| 9,863,323 B2 | 1/2018 | Kirtley et al. | |
| 9,869,201 B2 | 1/2018 | Dyson et al. | |
| 9,874,104 B2 | 1/2018 | Shapiro | |
| 9,915,162 B2 | 3/2018 | Duguay | |
| 9,945,484 B2 | 4/2018 | Moehrle et al. | |
| 9,957,827 B2 | 5/2018 | Davis et al. | |
| 9,982,550 B2 | 5/2018 | Davis | |
| 9,988,919 B2 | 6/2018 | Davis et al. | |
| 9,988,923 B2 | 6/2018 | Snyder et al. | |
| 10,012,099 B2 | 7/2018 | Cetel et al. | |
| 10,024,193 B2 | 7/2018 | Shapiro | |
| 10,072,517 B2 | 9/2018 | Boeke et al. | |
| 10,082,085 B2 | 9/2018 | Thomas et al. | |
| 10,087,771 B2 | 10/2018 | Mcgarrah | |
| 10,100,660 B2 | 10/2018 | Sippel et al. | |
| 10,132,197 B2 | 11/2018 | Heitman et al. | |
| 10,138,747 B2 | 11/2018 | Dev et al. | |
| 10,138,750 B2 | 11/2018 | Mccaffrey et al. | |
| 10,145,252 B2 * | 12/2018 | Kirby | F01D 9/04 |
| 10,167,957 B2 | 1/2019 | Davis et al. | |
| 10,202,863 B2 | 2/2019 | Davis et al. | |
| 10,265,806 B2 | 4/2019 | Cui et al. | |
| 10,267,174 B2 * | 4/2019 | Liu | C22C 1/08 |
| 10,281,045 B2 | 5/2019 | Sippel et al. | |
| 10,301,955 B2 | 5/2019 | Vetters et al. | |
| 10,301,960 B2 | 5/2019 | Stapleton et al. | |
| 10,378,385 B2 | 8/2019 | Tesson et al. | |
| 10,378,386 B2 | 8/2019 | Roussille et al. | |
| 10,415,426 B2 | 9/2019 | Quennehen et al. | |
| 10,415,427 B2 | 9/2019 | Quennehen et al. | |
| 10,422,241 B2 | 9/2019 | Mccaffrey et al. | |
| 10,428,688 B2 | 10/2019 | Quennehen et al. | |
| 10,428,953 B2 | 10/2019 | Lutjen et al. | |
| 10,443,419 B2 | 10/2019 | Thomas et al. | |
| 10,443,420 B2 | 10/2019 | Sippel et al. | |
| 10,465,545 B2 | 11/2019 | Cetel et al. | |
| 10,533,446 B2 | 1/2020 | Barak et al. | |
| 10,550,706 B2 | 2/2020 | Lutjen et al. | |
| 10,577,963 B2 | 3/2020 | Mccaffrey | |
| 10,577,977 B2 | 3/2020 | Baucco | |
| 10,584,605 B2 | 3/2020 | Sippel et al. | |
| 10,590,803 B2 | 3/2020 | Quennehen et al. | |
| 10,598,045 B2 | 3/2020 | Tableau et al. | |
| 10,605,120 B2 | 3/2020 | Quennehen et al. | |
| 10,619,517 B2 | 4/2020 | Quennehen et al. | |
| 10,626,745 B2 | 4/2020 | Roussille et al. | |
| 10,633,994 B2 | 4/2020 | Barker | |
| 10,648,362 B2 | 5/2020 | Groves, II et al. | |
| 10,655,495 B2 | 5/2020 | Groves, II et al. | |
| 10,655,501 B2 | 5/2020 | Lepretre et al. | |
| 10,662,794 B2 | 5/2020 | Das | |
| 10,669,878 B2 * | 6/2020 | Liu | C22C 9/06 |
| 10,689,998 B2 | 6/2020 | Stapleton et al. | |
| 10,690,007 B2 | 6/2020 | Quennehen et al. | |
| 10,704,404 B2 | 7/2020 | Shi et al. | |
| 10,718,226 B2 | 7/2020 | Vetters et al. | |
| 10,724,399 B2 | 7/2020 | Carlin et al. | |
| 10,731,494 B2 | 8/2020 | Dev et al. | |
| 10,731,509 B2 | 8/2020 | Correia et al. | |
| 10,738,643 B2 | 8/2020 | Mccaffrey et al. | |
| 10,753,221 B2 | 8/2020 | Barker et al. | |
| 10,787,924 B2 | 9/2020 | Quennehen et al. | |
| 10,794,204 B2 | 10/2020 | Fitzpatrick et al. | |
| 10,801,345 B2 | 10/2020 | Clum et al. | |
| 10,801,349 B2 | 10/2020 | Mccaffrey | |
| 10,815,807 B2 | 10/2020 | Vantassel et al. | |
| 10,815,810 B2 | 10/2020 | Barker et al. | |
| 10,822,285 B2 * | 11/2020 | Kirby | C04B 41/5051 |
| 10,830,357 B2 | 11/2020 | Mccaffrey et al. | |
| 10,851,656 B2 * | 12/2020 | Gong | C23C 28/042 |
| 10,858,950 B2 * | 12/2020 | Shi | F01D 11/14 |
| 10,890,079 B2 | 1/2021 | Propheter-Hinckley et al. | |
| 10,907,487 B2 | 2/2021 | Zurmehly et al. | |
| 10,907,501 B2 | 2/2021 | Filippi et al. | |
| 10,934,872 B2 | 3/2021 | Tableau et al. | |
| 10,934,873 B2 | 3/2021 | Sarawate et al. | |
| 10,968,761 B2 | 4/2021 | Barker et al. | |
| 10,968,777 B2 | 4/2021 | Propheter-Hinckley et al. | |
| 10,982,559 B2 | 4/2021 | Filippi | |
| 11,002,144 B2 | 5/2021 | Azad et al. | |
| 11,015,613 B2 | 5/2021 | Kerns et al. | |
| 11,021,988 B2 | 6/2021 | Tableau et al. | |
| 11,021,990 B2 | 6/2021 | Filippi | |
| 11,028,720 B2 | 6/2021 | Tableau et al. | |
| 11,041,399 B2 | 6/2021 | Lutjen et al. | |
| 11,047,245 B2 | 6/2021 | Mccaffrey | |
| 11,066,947 B2 | 7/2021 | Sippel et al. | |
| 11,073,045 B2 | 7/2021 | Sippel et al. | |
| 11,078,804 B2 | 8/2021 | Tableau et al. | |
| 11,085,316 B2 | 8/2021 | Barker et al. | |
| 11,085,317 B2 | 8/2021 | Johnson et al. | |
| 11,105,215 B2 | 8/2021 | Roy Thill et al. | |
| 11,111,794 B2 | 9/2021 | Bitzko et al. | |
| 11,111,802 B2 | 9/2021 | Propheter-Hinckley et al. | |
| 11,111,822 B2 | 9/2021 | Tableau et al. | |
| 11,111,823 B2 | 9/2021 | Jarrossay et al. | |
| 11,125,096 B2 | 9/2021 | Clark et al. | |
| 11,125,098 B2 | 9/2021 | Barker et al. | |
| 11,143,050 B2 | 10/2021 | Roy Thill et al. | |
| 11,149,574 B2 | 10/2021 | Laroche | |
| 11,174,747 B2 | 11/2021 | Roy Thill et al. | |
| 11,174,795 B2 | 11/2021 | Lutjen et al. | |
| 11,181,006 B2 | 11/2021 | Smoke et al. | |
| 11,187,094 B2 | 11/2021 | Feldmann et al. | |
| 11,208,896 B1 * | 12/2021 | Baucco | F01D 9/065 |
| 11,208,911 B2 * | 12/2021 | Sadler | F01D 11/08 |
| 11,215,064 B2 | 1/2022 | Arbona et al. | |
| 11,215,065 B2 | 1/2022 | Starr et al. | |

(56) References Cited

U.S. PATENT DOCUMENTS

| | | | |
|---|---|---|---|
| 11,215,080 B1* | 1/2022 | Freeman | F01D 25/12 |
| 11,215,081 B2 | 1/2022 | Schilling et al. | |
| 11,220,928 B1* | 1/2022 | Baucco | F02C 7/12 |
| 11,248,480 B2 | 2/2022 | Thirumalal et al. | |
| 11,255,208 B2 | 2/2022 | Clark et al. | |
| 11,255,209 B2 | 2/2022 | Clark et al. | |
| 11,255,210 B1* | 2/2022 | Freeman | F01D 11/16 |
| 11,286,812 B1 | 3/2022 | Freeman et al. | |
| 11,313,242 B2 | 4/2022 | Cetel et al. | |
| 11,319,827 B2 | 5/2022 | Clark et al. | |
| 11,319,828 B1 | 5/2022 | Freeman et al. | |
| 11,326,463 B2 | 5/2022 | Blaney et al. | |
| 11,326,470 B2 | 5/2022 | Dyson et al. | |
| 11,346,237 B1 | 5/2022 | Freeman et al. | |
| 11,346,251 B1 | 5/2022 | Freeman et al. | |
| 11,365,635 B2 | 6/2022 | Read et al. | |
| 11,441,434 B2 | 9/2022 | Danis et al. | |
| 11,441,441 B1 | 9/2022 | Freeman et al. | |
| 11,466,585 B2 | 10/2022 | Arbona et al. | |
| 11,466,586 B2 | 10/2022 | Sippel et al. | |
| 11,499,444 B1 | 11/2022 | Freeman et al. | |
| 11,506,085 B2 | 11/2022 | Jarrossay et al. | |
| 11,542,825 B2 | 1/2023 | Hauswirth et al. | |
| 11,542,827 B2 | 1/2023 | Quennehen et al. | |
| 11,566,531 B2* | 1/2023 | Shi | F01D 11/122 |
| 11,597,991 B2* | 3/2023 | Strock | C23C 28/36 |
| 11,624,291 B2 | 4/2023 | Roy Thill et al. | |
| 11,624,292 B2 | 4/2023 | Clark et al. | |
| 11,629,607 B2 | 4/2023 | Freeman et al. | |
| 11,643,939 B2 | 5/2023 | Stoyanov et al. | |
| 11,686,208 B2* | 6/2023 | Ribic | F01D 11/122 415/173.4 |
| 11,702,948 B2 | 7/2023 | Hock et al. | |
| 11,702,949 B2 | 7/2023 | Freeman et al. | |
| 11,713,694 B1 | 8/2023 | Freeman et al. | |
| 11,732,604 B1 | 8/2023 | Freeman et al. | |
| 11,761,351 B2 | 9/2023 | Freeman et al. | |
| 11,773,751 B1 | 10/2023 | Freeman et al. | |
| 11,781,440 B2 | 10/2023 | Vincent et al. | |
| 11,781,448 B1 | 10/2023 | Holleran | |
| 11,840,930 B2 | 12/2023 | Propheter-Hinckley et al. | |
| 11,840,936 B1 | 12/2023 | Freeman et al. | |
| 11,879,349 B2 | 1/2024 | Schilling et al. | |
| 2010/0021716 A1* | 1/2010 | Strock | C23C 18/04 428/428 |
| 2013/0089673 A1* | 4/2013 | Kirby | C04B 41/009 427/452 |
| 2013/0089720 A1* | 4/2013 | Kirby | C08K 13/02 524/386 |
| 2016/0265367 A1* | 9/2016 | Rosenzweig | C04B 41/52 |
| 2016/0348250 A1* | 12/2016 | Ahmad | C23C 28/321 |
| 2017/0167279 A1* | 6/2017 | Kirby | C04B 41/52 |
| 2021/0108532 A1* | 4/2021 | Freeman | F01D 25/246 |
| 2021/0131300 A1* | 5/2021 | Arbona | F01D 11/005 |
| 2021/0164365 A1* | 6/2021 | Starr | F01D 11/08 |
| 2021/0188721 A1* | 6/2021 | Shi | C04B 41/89 |
| 2021/0221749 A1* | 7/2021 | Golden | C04B 41/4533 |
| 2021/0276925 A1* | 9/2021 | Shi | F01D 5/286 |
| 2021/0332713 A1* | 10/2021 | Sadler | F01D 25/246 |
| 2023/0184124 A1 | 6/2023 | Stoyanov et al. | |
| 2023/0296029 A1* | 9/2023 | Joost | C04B 41/87 415/173.4 |
| 2023/0332506 A1 | 10/2023 | Freeman et al. | |
| 2024/0003267 A1 | 1/2024 | Cazin et al. | |

* cited by examiner

METHOD AND APPARATUS FOR CERAMIC MATRIX COMPOSITE TURBINE SHROUD ASSEMBLY

CROSS REFERENCE TO RELATED APPLICATIONS

This application claims priority to and the benefit of U.S. patent application Ser. No. 18/528,739, filed 4 Dec. 2023, the disclosure of which is now expressly incorporated herein by reference.

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine shroud assembly adapted for use with a gas turbine engine may include a shroud segment. The shroud segment may be made of ceramic matrix composite materials.

In some embodiments, the shroud segment may comprise a heat shield, an attachment feature, and a multi-layer coating. The heat shield may extend circumferentially partway around an axis of the gas turbine engine. The attachment feature may extend radially outward from the heat shield. The multi-layer coating may be applied to the shroud segment.

In some embodiments, the heat shield may have primary body surfaces. The primary body surfaces may include an inner surface, a first outer surface spaced apart radially from the inner surface, a first end surface that extends between and interconnects the inner surface and the first outer surface.

In some embodiments, the attachment feature may have a first attachment surface. The first attachment surface may extend radially outward from the first outer surface of the heat shield.

In some embodiments, the multi-layer coating may comprise a surface layer comprising a monolithic silicon carbon material, a bond layer comprising a silicon metallic material, a barrier layer comprising a first environmental barrier coating material, and an abradable layer comprising a second environmental barrier coating material. The second environmental barrier coating material may have a different porosity than the first environmental barrier coating material.

In some embodiments, the surface layer may extend over the inner surface, the first outer surface, and along a portion of the first attachment surface of the attachment feature. The bond layer may extend over the surface layer on the associated surfaces and the first end surface of the primary body surfaces on the heat shield. The barrier layer may extend over the bond layer. The abradable layer may extend over the barrier layer on the inner surface, the first outer surface, and along a portion of the first attachment surface of the attachment feature.

In some embodiments, the turbine shroud assembly may further comprise a carrier segment made of metallic materials. The carrier segment may be arranged circumferentially at least partway around the axis.

In some embodiments, the carrier segment may have an outer wall, a forward support wall that extends radially inward from the outer wall axially forward of the attachment feature, and an aft support wall axially that extends radially inward from the outer wall axially aft of the attachment feature. The aft support wall may be spaced apart axially from the forward support wall to define an attachment-receiving space axially between the forward and aft support arms.

In some embodiments, the aft support wall may include a radially-extending wall and an axial locator. The radially-extending wall may extend radially inward from the outer wall. The axial locator may extend axially from the radially-extending wall and engage the barrier layer of the multi-layer coating on the first attachment surface of the attachment feature.

In some embodiments, the primary body surfaces may further comprise a second outer surface spaced apart radially from the inner surface and a second end surface spaced apart axially from the first end surface. The second end surface may extend between and interconnect the inner surface and the second outer surface. The surface layer of the multi-layer coating may extend over the second outer surface, the bond layer of the multi-layer coating may extend over the surface layer on the associated surfaces and the second end surface of the primary body surfaces on the heat shield, the barrier layer of the multi-layer coating may extend over the bond layer, and the abradable layer of the multi-layer coating may extend over the barrier layer on the second outer surface.

In some embodiments, the forward support wall and the aft support wall may each be formed to define a channel. The channel may extend circumferentially at least partway about the axis and opens toward the heat shield of the shroud segment.

In some embodiments, the turbine shroud assembly may further comprise at least one seal member. The at least one seal member may be arranged in each channel to locate the at least one seal member radially between one of the forward support wall and the aft support wall and the abradable layer of the multi-layer coating.

In some embodiments, the attachment feature may define a second attachment surface. The second attachment surface may extend radially outward from the second outer surface of the heat shield. The multi-layer coating may extend up to the second attachment surface of the attachment feature such that the multi-layer coating does not extend over the second attachment surface of the attachment feature.

In some embodiments, the turbine shroud assembly may further comprise a retainer. The retainer may extend axially into the attachment feature of the shroud segment and the carrier segment to couple the shroud segment to the carrier segment. The multi-layer coating may extend along the portion of the first attachment surface at least up to a minimum line located radially below the retainer.

In some embodiments, the multi-layer coating may extend along the portion of the first attachment surface up to a point above the minimum line located radially below the retainer and below a maximum line located radially above the minimum line and radially below a top point of the retainer. In some embodiments, the multi-layer coating may extend along the portion of the first attachment surface up to a maximum line located radially above the minimum line and radially below a top point of the retainer.

In some embodiments, the attachment feature of the shroud segment may include a forward attachment flange that extends radially outward from the heat shield and an aft attachment flange that extends radially outward from the heat shield. The aft attachment flange may be spaced apart axially aft of the forward attachment flange. The aft attachment flange may define the first attachment surface.

In some embodiments, the primary body surfaces may further comprise a second outer surface spaced apart radially from the inner surface and a second end surface spaced apart axially from the first end surface. The second end surface may extend between and interconnects the inner surface and the second outer surface. The surface layer may extend over the second outer surface, the bond layer may extend over the surface layer on the associated surfaces and the second end surface of the primary body surfaces on the heat shield, the barrier layer may extend over the bond layer, and the abradable layer may extend over the barrier layer on the second outer surface.

In some embodiments, the forward attachment flange may define a second attachment surface. The second attachment surface may extend radially outward from the second outer surface of the heat shield. In some embodiments, the multi-layer coating may extend up to the second attachment surface of the forward attachment flange.

According to another aspect of the present invention, a turbine shroud assembly adapted for use with a gas turbine engine may comprise a carrier segment made of metallic materials and a shroud segment made of ceramic matrix composite materials. The carrier segment may be arranged circumferentially at least partway around an axis of the gas turbine engine. The carrier segment may be shaped to define an attachment-receiving space. The shroud segment may be supported by the carrier segment.

In some embodiments, the shroud segment may comprise a heat shield, an attachment feature, and a multi-layer coating. The heat shield may extend circumferentially partway around the axis. The attachment feature may extend radially outward from the heat shield into the attachment-receiving space.

In some embodiments, the heat shield may have primary body surfaces. The primary body surfaces may comprise an inner surface, a first outer surface spaced apart radially from the inner surface, a first end surface that extends between and interconnects the inner surface and the first outer surface.

In some embodiments, the attachment feature may have a first attachment surface. The first attachment surface may extend radially outward from the first outer surface of the heat shield.

In some embodiments, the multi-layer coating may be applied to the primary body surfaces of the heat shield and a portion of the first attachment surface of the attachment feature. The multi-layer coating may comprise a surface layer comprising a monolithic silicon carbon material, a bond layer comprising a silicon metallic material that extends over the surface layer, a barrier layer comprising a first environmental barrier coating material that extends over the bond layer, and an abradable layer comprising a second environmental barrier coating material that has a different porosity than the first environmental barrier coating material that extends over the barrier layer.

In some embodiments, the carrier segment may include an axial locator. The axial locator may extend axially into the attachment-receiving space and engage the barrier layer of the multi-layer coating on the first attachment surface of the attachment feature.

In some embodiments, the attachment feature of the shroud segment may include a forward attachment flange and an aft attachment flange. The forward attachment flange may extend radially outward from the heat shield. The aft attachment flange may extend radially outward from the heat shield. The aft attachment flange may be spaced apart axially aft of the forward attachment flange. The aft attachment flange may define the first attachment surface.

In some embodiments, the primary body surfaces may further comprise a second outer surface and a second end surface. The second outer surface may be spaced apart radially from the inner surface. The second end surface may be spaced apart axially from the first end surface. The second end surface may extend between and interconnect the inner surface and the second outer surface.

In some embodiments, the bond layer and the barrier layer may each extend over the first end surface and the second end surface of the heat shield. The surface layer and the abradable layer may not extend over the first end surface and the second end surface of the heat shield.

In some embodiments, the turbine shroud assembly may further comprise a retainer. The retainer may extend axially into the attachment feature of the shroud segment and the carrier segment to couple the shroud segment to the carrier segment.

In some embodiments, the multi-layer coating may extend along the portion of the first attachment surface at least up to a minimum line located radially below the retainer. The multi-layer coating may extend along the portion of the first attachment surface up to a point above the minimum line located radially below the retainer and below a maximum line located radially above the minimum line and radially below a top point of the retainer.

In some embodiments, the carrier segment may be formed to a channel that extends circumferentially at least partway about the axis and opens toward the heat shield of the shroud segment. The turbine shroud assembly may further comprise at least one seal member arranged in the channel to locate the at least one seal member radially between the carrier segment and the abradable layer of the multi-layer coating.

According to another aspect of the present disclosure, a method may comprise providing a shroud segment. The shroud segment may be made of ceramic matrix composite materials.

In some embodiments, the shroud segment may comprise a heat shield that extends circumferentially partway around the axis and an attachment feature that extends radially outward from the heat shield. The heat shield may have primary body surfaces made up of an inner surface, a first outer surface spaced apart radially from the inner surface, a first end surface that extends between and interconnects the inner surface and the first outer surface. The attachment feature may have a first attachment surface that extends radially outward from the first outer surface of the heat shield.

In some embodiments, the method may further comprise applying a surface layer comprising a monolithic silicon carbon material to the inner surface, the first outer surface, and along a portion of the first attachment surface. In some embodiments, the method may further comprise applying a bond layer comprising a silicon metallic material over the surface layer on the associated surfaces and to the first end surface.

In some embodiments, the method may further comprise applying a barrier layer comprising a first environmental barrier coating material over the bond layer. In some embodiments, the method may further comprise applying an abradable layer comprising a second environmental barrier coating material that has a different porosity than the first environmental barrier coating material over the barrier layer on the inner surface, the first outer surface, and along the portion of the first attachment surface.

In some embodiments, the method may further comprise machining a portion of the abradable layer on the portion of the first attachment surface of the attachment feature. The portion of the abradable layer on the portion of the first attachment surface of the attachment feature may be machined to expose the barrier layer underneath.

In some embodiments, the method may further comprise providing a carrier segment made of metallic materials that extends circumferentially at least partway around the axis. The carrier segment may have an outer wall, a forward support wall that extends radially inward from the outer wall axially forward of the attachment feature, and an aft support wall axially that extends radially inward from the outer wall axially aft of the attachment feature. The aft support wall may be spaced apart axially from the forward support wall to define an attachment-receiving space axially therebetween.

In some embodiments, the method may further comprise arranging the attachment feature of the shroud segment in the attachment-receiving space of the carrier segment axially between the forward support wall and the aft support wall of the carrier segment. The attachment feature of the shroud segment may be arranged in the attachment-receiving space so that an axial location feature included on the aft support wall of the carrier segment engages the barrier layer on the first attachment surface of the attachment feature of the shroud segment.

These and other features of the present disclosure will become more apparent from the following description of the illustrative embodiments.

DETAILED DESCRIPTION OF THE DRAWINGS

Figure 1:
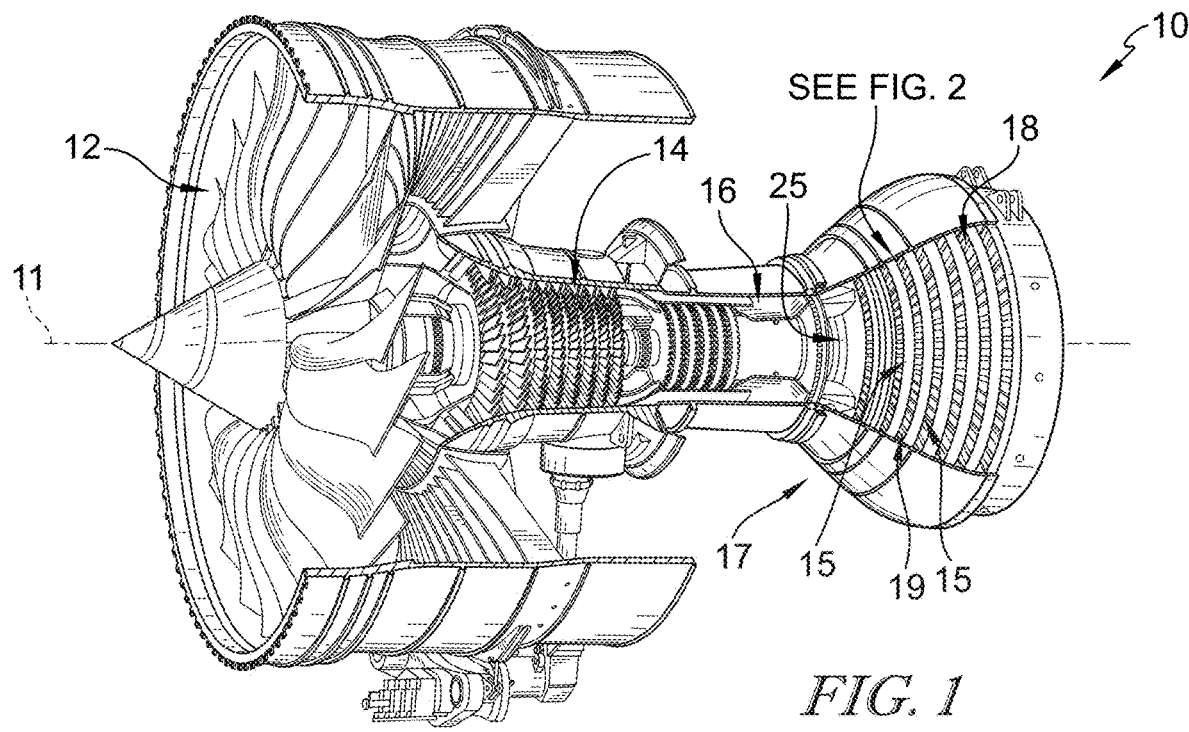
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

A turbine shroud segment 22 adapted for use in a gas turbine engine 10 is shown in FIGS. 2-6. The turbine shroud segment 22 includes a shroud segment 24, a carrier segment 26, and a mount system 28 as shown in FIGS. 2-5. The shroud segment 24 is arranged circumferentially at least partway around an axis 11 of the gas turbine engine 10. The carrier segment 26 are arranged circumferentially partway about the axis 11 and supports the shroud segment 24 relative to the axis 11. The mount system 28 is configured to couple the shroud segment 24 to the carrier segment 26.

The shroud segment 24 is a ceramic matrix composite component configured to directly face the high temperatures of a gas path 25 of the gas turbine engine 10. The carrier segment 26 is a metallic support component configured to interface with other metallic components of the gas turbine engine 10, such as the case 17, to support the shroud segment 24 to radially locate the shroud segment 24 relative to the axis 11.

The shroud segment 24 includes a heat shield 30, an attachment feature 32, and a multi-layer coating 34 as shown in FIGS. 2-6. The heat shield 30 that extends circumferentially partway around the axis 11. The attachment feature 32 includes a forward attachment flange 36 and an aft attachment flange 38 that each extend radially outward from the heat shield 30. The aft attachment flange 38 is spaced apart axially from the forward attachment flange 36. The multi-layer coating 34 extends over different surfaces on the heat shield 30 and the attachment feature 32 to protect the shroud segment 24 against damage from exposure to the environment in a turbine 18 of the gas turbine engine 10 during operation of the gas turbine engine 10.

The multi-layer coating 34 may also be used to account for variation in surface location of the parts with respect to the shroud segment 24. The multi-layer coating 34 may be built up or machined away in certain areas to account for the variation in surface location or tolerances between the shroud segment 24 and other components in the turbine shroud assembly 22. In some embodiments, some of the layers of the multi-layer coating 34 may be applied thicker and machined away to account for the desired tolerances.

Figure 3:
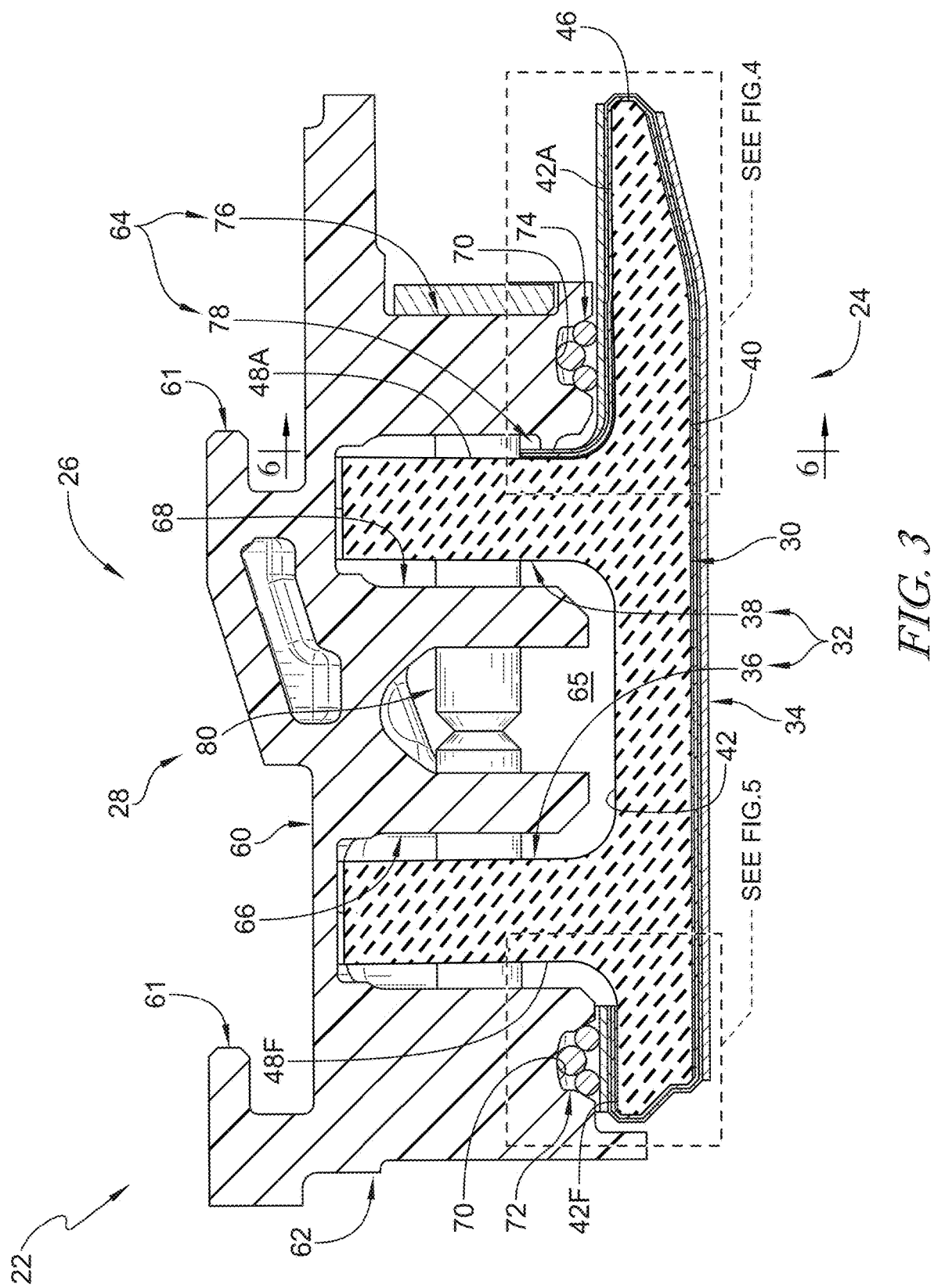
FIG. 3 is a cross-section view of a portion of the turbine shroud assembly of FIG. 2 showing the shroud segment includes a heat shield that extends circumferentially partway around an axis of the gas turbine engine, an attachment feature that extends radially outward from the heat shield, and a multi-layer coating applied to different surfaces on the heat shield and the attachment feature, and further showing the multi-layer coating includes a surface layer comprising a monolithic silicon carbon material, a bond layer comprising a silicon metallic material applied over the surface layer on the associated surfaces, a barrier layer comprising a first environmental barrier coating material applied over the bond layer, and an abradable layer comprising a second environmental barrier coating material with a different applied over the barrier layer on different associated surfaces.
Figure 4:
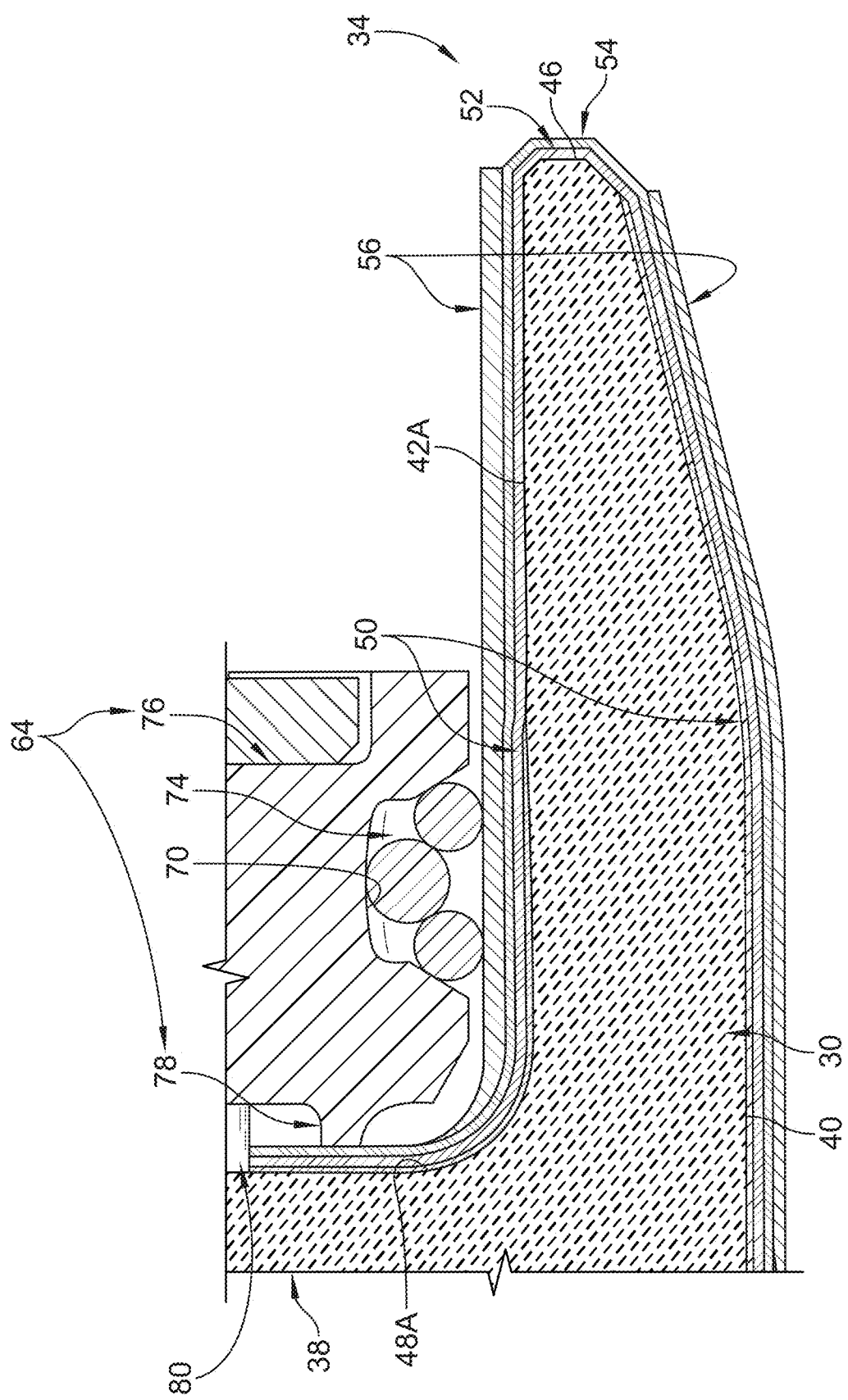
FIG. 4 is a detail view of FIG. 3 showing the surface layer is applied to an inner surface of the heat shield, an outer surface of the heat shield, and along a portion of the aft attachment surface of the attachment feature, showing the bond layer is applied over the surface layer on the associated surfaces as well as an aft end surface of the heat shield, showing the barrier layer is applied over the bond layer, and showing the abradable layer is applied over the barrier layer on the inner surface of the heat shield, the outer surface of the heat shield, and along a portion of the aft attachment surface of the attachment feature such that an axial location feature of the carrier segment engages the barrier layer on the attachment feature.
Figure 5:
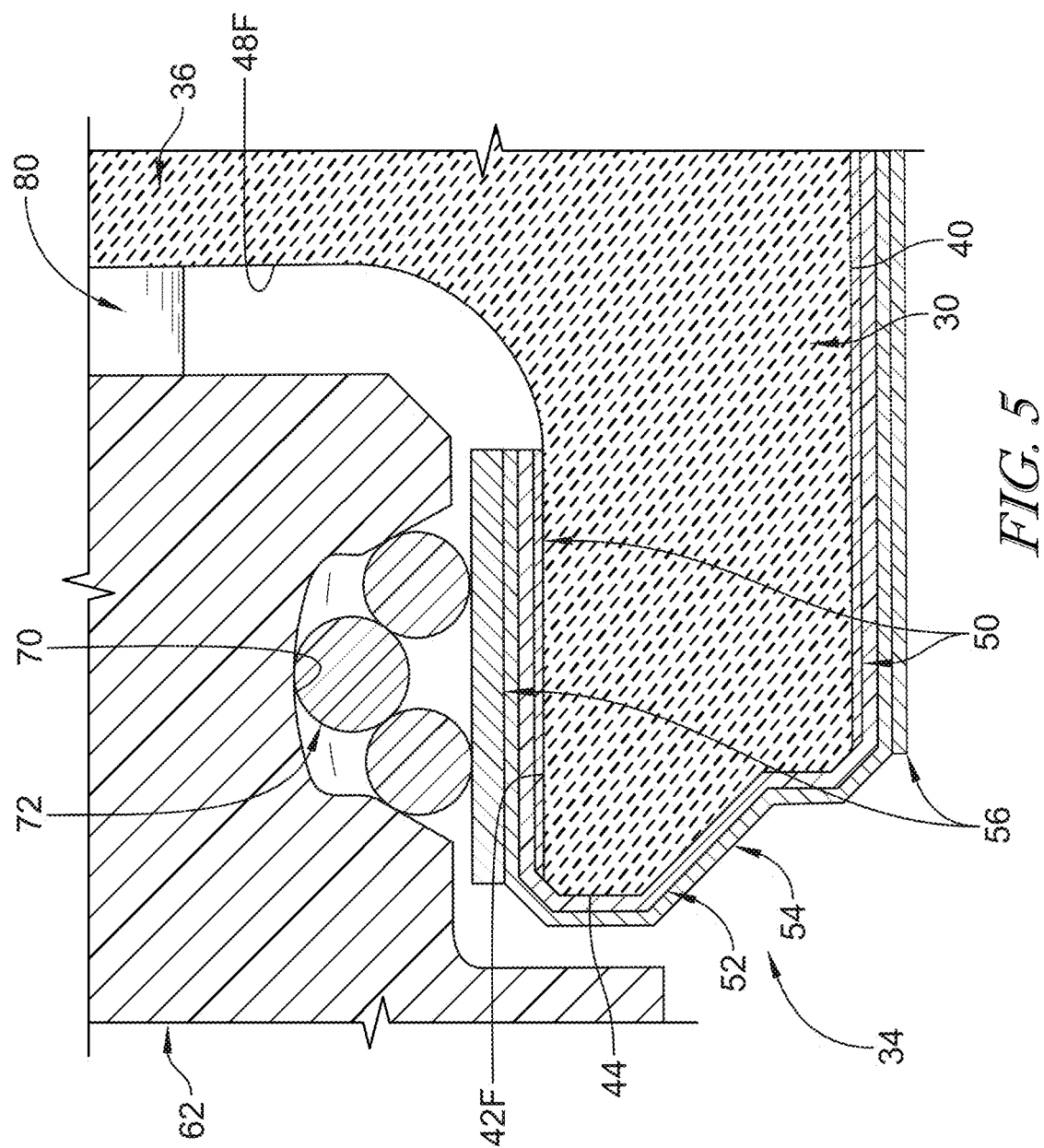
FIG. 5 is a detail view of FIG. 3 showing the surface layer is applied to the inner surface of the heat shield, the outer surface of the heat shield, and along a portion of a forward-facing attachment surface of the attachment feature, showing the bond layer is applied over the surface layer on the associated surfaces as well as a forward end surface of the heat shield, showing the barrier layer is applied over the bond layer, and showing the abradable layer is applied over the barrier layer on the inner surface of the heat shield, the outer surface of the heat shield, and along a portion of the forward attachment surface of the attachment feature.

The heat shield 30 has primary body surfaces including an inner surface 40, a forward outer surface 42F, an aft outer surface 42A, a forward end surface 44, and an aft end surface 42A as shown in FIGS. 3-5. The forward and aft outer surfaces 42F, 42A are spaced apart radially from the inner surface 40. The forward end surface 44 extends between and interconnects the inner surface 40 and a forward outer surface 42F, while the aft end surface 46 extends between and interconnects the inner surface 40 and an aft outer surface 42A.

The attachment feature 32 has a forward attachment surface 48F and an aft attachment surface 48A as shown in FIGS. 3-5. The forward attachment surface 48F that extends radially outward from the forward outer surface 42F of the heat shield 30, while the aft attachment surface 48A that extends radially outward from the aft outer surface 42A of the heat shield 30.

The multi-layer coating 34 includes a surface layer 50, a bond layer 52, a barrier layer 54, and an abradable layer 56 as shown in FIGS. 3-5. The surface layer 50 comprises a monolithic silicon carbon material. The bond layer 52 comprises a silicon metal material. The barrier layer 54 comprises a first environmental barrier coating material. The abradable layer 56 comprises a second environmental barrier coating material that has a different porosity than the first environmental barrier coating material.

The surface layer 50 is applied to the inner surface 40, the forward and aft outer surfaces 42F, 42A, and along a portion of the aft attachment surface 48A of the aft attachment flange 38. The bond layer 52 is applied over the surface layer 50 on the associated surfaces 40, 42F, 42A, 48A and to the forward and aft end surfaces 44, 46 of the primary body surfaces on the heat shield 30. The barrier layer 54 is applied over the bond layer 52. The abradable layer 56 is applied over the barrier layer 54 on the inner surface 40, forward and aft outer surfaces 42F, 42A, and along the portion of the aft attachment surface 48A of the aft attachment flange 38.

The abradable layer 56 is partly machined away at the aft attachment surface 48A to reveal the barrier layer 54 as shown in FIGS. 3 and 4. The carrier segment 26 includes an axial location feature 78 that engages the barrier layer 54 on the aft attachment flange 38 to axially locate the shroud segment 24 relative to the carrier segment 26.

With the multi-layer coating 34 included in the shroud segment 24 of the present disclosure initially described above, the gas turbine engine 10 is now described in more detail. The gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
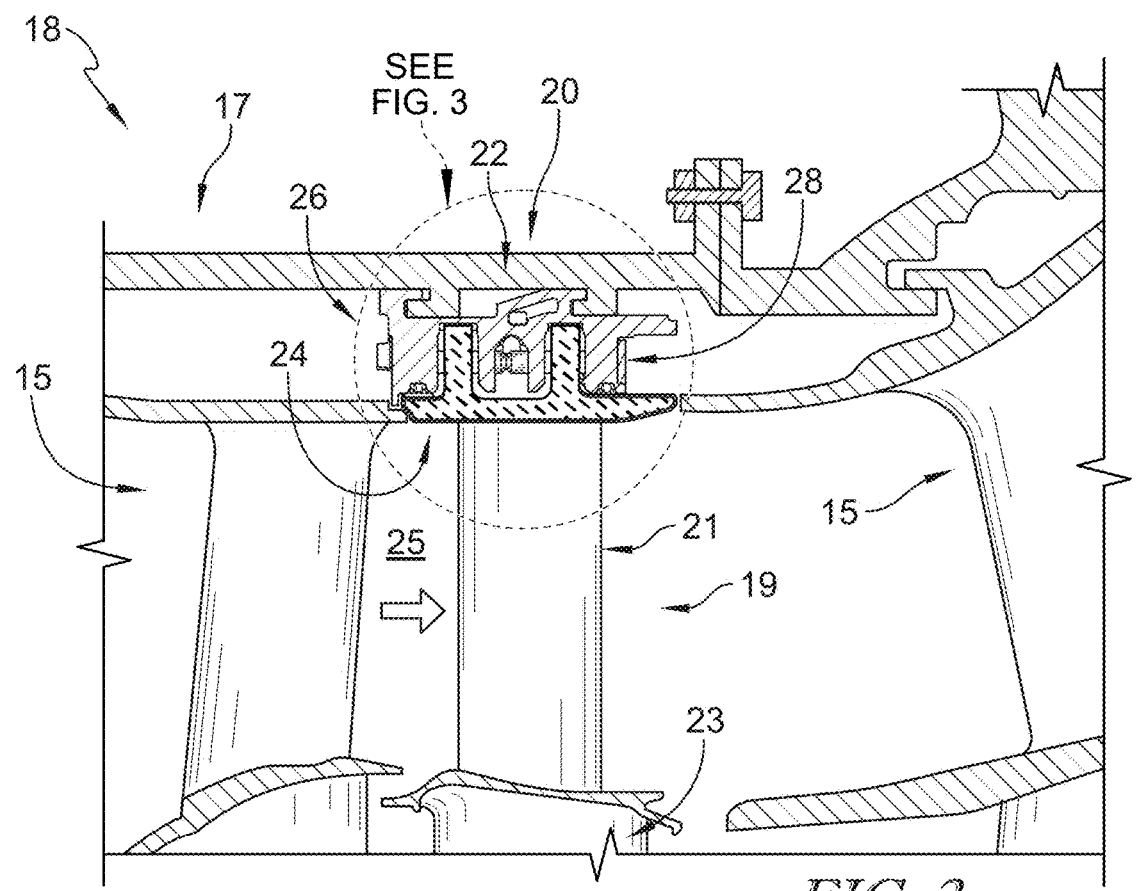
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades, and further showing the turbine shroud assembly includes a carrier segment, a shroud segment made from ceramic matrix composite materials supported by the carrier segment, and a mount system including retainers that couple the shroud segment to the carrier segment.

The turbine 18 includes at least one turbine wheel assembly 19 and a turbine shroud 20 positioned to surround the turbine wheel assembly 19 as shown in FIGS. 1 and 2. The turbine wheel assembly 19 includes a plurality of blades 21 coupled to a rotor disk 23 for rotation with the disk 23. The hot, high pressure combustion products from the combustor 16 are directed toward the blades 21 of the turbine wheel assemblies 19 along the gas path 25. The turbine shroud 20 is coupled to the outer case 17 of the gas turbine engine 10 and extends around the turbine wheel assembly 19 to block gases from passing over the turbine blades 21 during use of the turbine 18 in the gas turbine engine 10.

In the illustrative embodiment, the turbine shroud 20 is made up of a number of turbine shroud segment assemblies 22 that each extend circumferentially partway around the axis 11 and cooperate to surround the turbine wheel assembly 19. In other embodiments, the turbine shroud 20 is annular and non-segmented to extend fully around the axis 11 and surround the turbine wheel assembly 19. In yet other embodiments, certain components of the turbine shroud 20 are segmented while other components are annular and non-segmented.

Each turbine shroud assembly 22 includes the shroud segment 24, a carrier segment 26, and a mount system 28 as shown in FIGS. 2-6. The shroud segment 24 and the carrier segment 26 are arranged circumferentially partway about the axis 11. The mount system 28 is configured to couple the shroud segment 24 to the carrier segment 26.

The shroud segment 24 includes the heat shield 30, the forward and aft attachment flanges 36, 38, and the multi-layer coating 34 as shown in FIGS. 3-5. The heat shield 30 has the primary body surfaces including an inner surface 40, a forward outer surface 42F spaced apart radially from the inner surface 40, an aft outer surface 42A spaced apart radially from the inner surface 40, and forward and aft end surfaces 44, 46 that extends between and interconnects the inner surface 40 and the outer surfaces 42F, 42A. The forward end surface 44 extends between and interconnects the inner surface 40 and the forward outer surface 42F, while the aft end surface 46 extends between and interconnects the inner surface 40 and the aft outer surface 42A.

The forward attachment flange 36 of the shroud segment 24 defines the forward or forward-facing attachment surface 48F and the aft attachment flange 38 of the shroud segment 24 defines the aft or aft-facing attachment surface 48A. The forward attachment surface 48F extends radially outward from the forward outer surface 42F of the heat shield 30. The aft attachment surface 48A extends radially outward from the aft outer surface 42A of the heat shield 30.

The carrier segment includes an outer wall 60, a pair of hangers 61, a forward support wall 62, and an aft support wall 64 as shown in FIGS. 3-6. The outer wall 60 extends circumferentially at least partway about the axis 11. The hangers 61 extend radially outward from the outer wall 60 and engage the case 17 to couple the turbine shroud segment 22 to the rest of the engine 10. The forward support wall 62 extends radially inward from the outer wall 60 axially forward of the forward attachment flange 36. The aft support wall 64 extends radially inward from the outer wall 60 axially aft of the aft attachment flange 38. The aft support wall 64 is spaced apart axially from the forward support wall 62 to define an attachment-receiving space 65 therebetween. The attachment feature 32 extends into the attachment-receiving space 65 of the carrier segment 26.

In the illustrative embodiment, the carrier segment 26 further includes a first intermediate support wall 66 and a second intermediate support wall 68 as shown in FIG. 3. The first intermediate support wall 66 and the second intermediate support wall 68 each extend radially inward from the outer wall 60 of the carrier segment 26.

In the illustrative embodiment, both the forward support wall 62 and the aft support wall 64 include channels 70 as shown in FIGS. 3-5. Each channel 70 extends radially inward into the corresponding support wall 62, 64. Seals 72, 74 included in the assembly 22 are arranged in each channel 70.

The aft support wall 64 includes a radially-extending wall 76 and a chordal seal 78 as shown in FIGS. 3 and 4. The radially-extending wall 76 extends radially inward from the outer wall 60. The chordal seal 78 extends axially from the radially-extending wall 76 toward the aft attachment flange 38 and engages the multi-layer coating 34.

Figure 6:
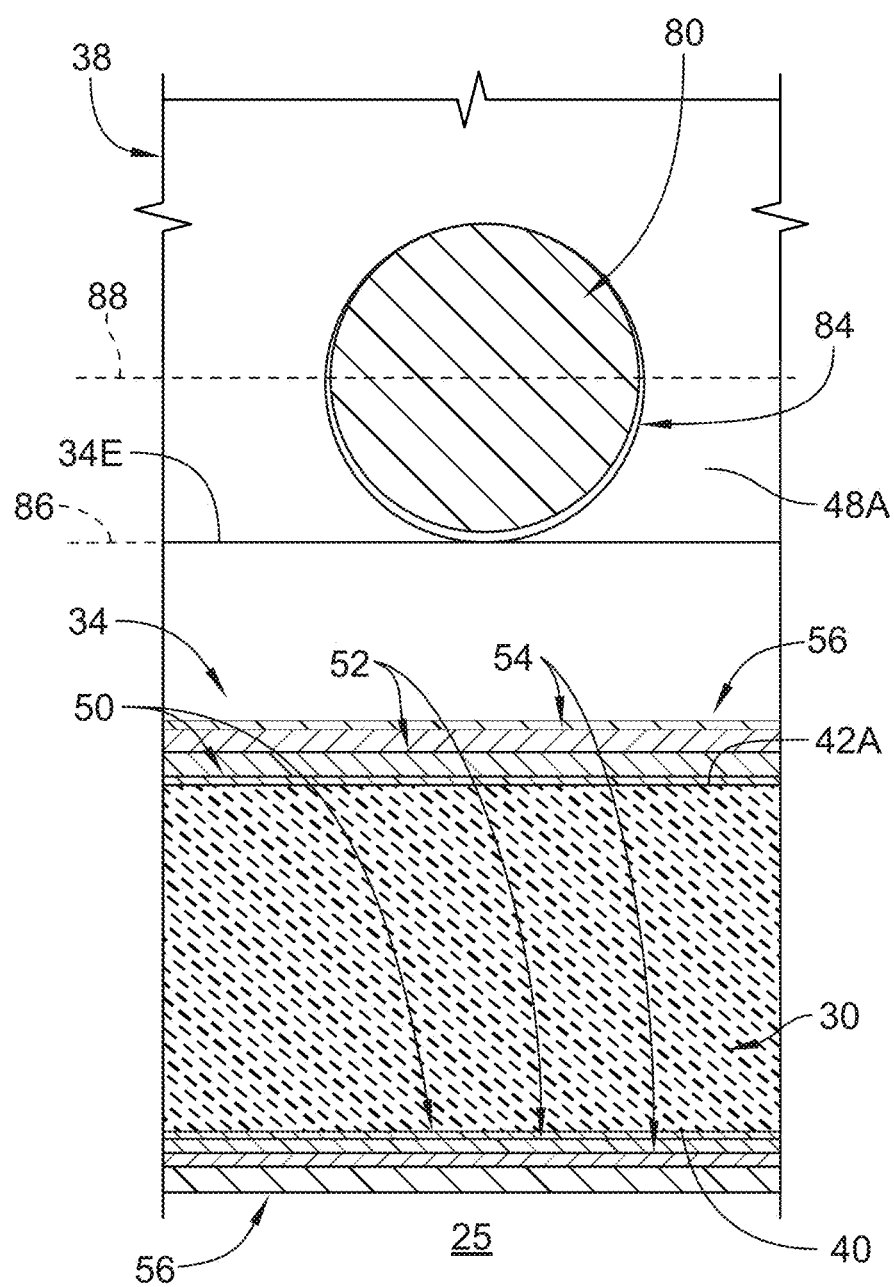
FIG. 6 is a cross-section view of the turbine shroud assembly of FIG. 3 taking along line 6-6 showing the multi-layer coating extends along the portion of the aft attachment surface up to a minimum line located radially below the retainer, but may extend past the minimum line up to a maximum line located radially above the minimum line and radially below a top point of the retainer.

The mount system 28 includes at least one retainer 80, illustratively two retainers spaced apart circumferentially, as shown in FIGS. 3, 6, and 7. The retainer 80 extends axially into the forward support wall 62, through the forward attachment flange 36, the intermediate support walls 66, 68, and the aft attachment flange 38, and into the aft support wall 64 of the carrier segment 26 so as to couple the shroud segment 24 to the carrier segment 26.

Each attachment flange 36, 38 includes through holes 84 for each retainer 80 as shown in FIGS. 6 and 7. The through holes 84 extend axially through the forward attachment flange 36 and the aft attachment flange 38.

The multi-layer coating 34 includes the surface layer 50, the bond layer 52, the barrier layer 54, and the abradable layer 56 as shown in FIGS. 3-5. The surface layer 50 is applied to the inner surface 40, the forward and aft outer surfaces 42F, 42A, and along a portion of the aft attachment surface 48A of the aft attachment flange 38. The bond layer 52 is applied over the surface layer 50 on the associated surfaces 40, 42F, 42A, 48A and to the forward and aft end surfaces 44, 46 of the primary body surfaces on the heat shield 30. The barrier layer 54 is applied over the bond layer 52. The abradable layer 56 is applied over the barrier layer 54 on the inner surface 40, forward and aft outer surfaces 42F, 42A, and along the portion of the aft attachment surface 48A of the aft attachment flange 38.

In the illustrative embodiment, both the surface layer 50 and the abradable layer 56 do not extend over the forward end surface 44 and the aft end surface 46 included in the primary body surfaces of the heat shield 30. Rather, the surface layer 50 and the abradable layer 56 terminate on the inner and outer surfaces 40, 42F, 42A before the forward end surface 44 and the aft end surface 46. The bond layer 52 and the barrier layer 54 each extend over the forward and aft end surfaces 44, 46 of the heat shield 30 in the illustrative embodiment.

The multi-layer coating 34 extends along the aft attachment surface 48A of the aft attachment flange 38 up to a minimum line 86 located radially below the retainer 80 as shown in FIG. 6. The multi-layer coating 34 does not extend the entire aft attachment surface 48A of the aft attachment flange 38.

On the aft attachment surface 48A, the multi-layer coating 34 may extend up to the minimum line 86 or past the minimum line 86 up to a maximum line 88 as shown in FIG. 6. The maximum line 88 is located radially above the minimum line 86, but radially below the top point of the retainer 80 as shown in FIG. 6. The multi-layer coating 34 may extend past the minimum line 86, but should not extend radially above the retainer 80.

In the illustrative embodiment, the multi-layer coating 34 extends up to the forward attachment surface 48F of the forward attachment flange 36, but does not extend along forward attachment surface 48F as shown in FIG. 5. In some embodiments, the multi-layer coating 34 may extend along a portion of the forward attachment surface 48F of the forward attachment flange 36. In some embodiments, the multi-layer coating 34 may extend along a portion of the forward attachment surface 48F of the forward attachment flange 36 up to the minimum line 86 or past the minimum line 86 up to a maximum line 88.

A method of forming the shroud segment 24 and assembling the turbine shroud segment 22 may include several steps. The method includes providing the shroud segment 24 having the heat shield 30 and the forward and aft attachment flanges 36, 38 that extend radially away from the heat shield 30. The method further includes applying the surface layer 50 to the inner surface 40, the forward outer surface 42F and the aft outer surface 42A. The method also includes applying the surface layer 50 up from the aft outer surface 42A along the aft attachment surface 48A up to at least the minimum line 86.

In the illustrative embodiment, the method includes applying the surface layer 50 to only the inner surface 40, the aft outer surface 42A up along a portion of the aft attachment surface 48A, and the forward outer surface 42F up to the forward attachment surface 42F. In some embodiments, the method may include applying the surface layer 50 on the forward outer surface 42F along the forward attachment surface 48F up to the minimum line 86.

The method further includes applying the bond layer 52 over the sections of the surface layer 50. The method includes applying the bond layer 52 around the forward and aft end surfaces 44, 46 as well. The method further includes applying the barrier layer 54 over the bond layer 52.

The method further includes applying the abradable layer 56 over the barrier layer 54. The abradable layer 56 is applied over the barrier layer 54 on the inner surface 40, the forward outer surface 42F and the aft outer surface 42A, and up from the aft outer surface 42A along the aft attachment surface 48A. The method further includes machining a portion of the abradable layer 56 on the portion of the aft attachment surface 42A of the aft attachment flange 38 to expose the barrier layer 54 underneath.

The method further includes arranging the attachment feature 32 in the attachment-receiving space 65 of the carrier segment 26. The attachment feature 32 is arranged in the attachment-receiving space 65 of the carrier segment 26 so that the axial location feature 76 included on the aft support wall 64 of the carrier segment 26 engages the barrier layer 54 on the aft attachment surface 48A of the aft attachment flange 38.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use with a gas turbine engine, the turbine shroud assembly comprising:
    a carrier segment made of metallic materials and arranged circumferentially at least partway around an axis of the gas turbine engine, the carrier segment having an outer wall, a first support wall that extends radially inward from the outer wall, and a second support wall that extends radially inward from the outer wall, the second support wall spaced apart axially from the first support wall to define an attachment-receiving space axially therebetween, and
    a shroud segment made of ceramic matrix composite materials supported by the carrier segment, the shroud segment comprising:
        a heat shield that extends circumferentially partway around the axis, the heat shield having primary body surfaces comprising an inner surface, a first outer surface spaced apart radially from the inner surface, a first end surface that extends between and interconnects the inner surface and the first outer surface, a second outer surface spaced apart radially from the inner surface, and a second end surface spaced apart axially from the first end surface that extends between and interconnects the inner surface and the second outer surface,
        an attachment feature that extends radially outward from the heat shield into the attachment-receiving space, the attachment feature having a first attachment surface that extends radially outward from the first outer surface of the heat shield and a second attachment surface that extends radially outward from the second outer surface of the heat shield, and
        a multi-layer coating extending along the primary body surfaces of the heat shield and at least a portion of the first attachment surface of the attachment feature,
    wherein the second support wall includes a radially-extending wall that extends radially inward from the outer wall and an axial locator that extends axially from the radially-extending wall and engages the multi-layer coating on the portion of the first attachment surface of the attachment feature, and
    wherein the multi-layer coating extends up to the second attachment surface of the attachment feature such that the multi-layer coating does not extend over the second attachment surface of the attachment feature.

2. The turbine shroud assembly of claim 1, wherein the first support wall and the second support wall are each formed to define a channel that extends circumferentially at least partway about the axis and opens toward the heat shield of the shroud segment, and
    wherein the turbine shroud assembly further comprises at least one seal member arranged in each channel to locate the at least one seal member radially between one of the first support wall and the second support wall and the multi-layer coating.

3. The turbine shroud assembly of claim 1, wherein the multi-layer coating comprises a surface layer, a bond layer that extends over the surface layer, a barrier layer that extends over the bond layer, and an abradable layer that extends over at least a portion of the barrier layer,
    wherein the axial locator engages one of the barrier layer and the abradable layer on the portion of the first attachment surface of the attachment feature.

4. The turbine shroud assembly of claim 1, wherein the attachment feature of the shroud segment includes a forward attachment flange that extends radially outward from the heat shield and a aft attachment flange that extends radially outward from the heat shield and spaced apart axially aft of the forward attachment flange, and wherein the aft attachment flange defines the first attachment surface, and the forward attachment flange defines the second attachment surface that extends radially outward from the second outer surface of the heat shield.

5. The turbine shroud assembly of claim 1, further comprising a retainer that extends axially into the attachment feature of the shroud segment and the carrier segment to couple the shroud segment to the carrier segment, and
    wherein the multi-layer coating extends along the portion of the first attachment surface at least up to a minimum line located radially below the retainer.

6. The turbine shroud assembly of claim 5, wherein the multi-layer coating extends along the portion of the first attachment surface up to a point above the minimum line located radially below the retainer and below a maximum line located radially above the minimum line and radially below a top point of the retainer.

7. The turbine shroud assembly of claim 5, wherein the multi-layer coating extends along the portion of the first attachment surface up to a maximum line located radially above the minimum line and radially below a top point of the retainer.

8. A turbine shroud assembly adapted for use with a gas turbine engine, the turbine shroud assembly comprising:
    a carrier segment arranged circumferentially at least partway around an axis of the gas turbine engine, the carrier segment shaped to define an attachment-receiving space, and
    a shroud segment made of ceramic matrix composite materials supported by the carrier segment, the shroud segment comprising:
        a heat shield that extends circumferentially partway around the axis, the heat shield having primary body surfaces comprising an inner surface, a first outer surface spaced apart radially from the inner surface, a first end surface that extends between and interconnects the inner surface and the first outer surface,
        an attachment feature that extends radially outward from the heat shield into the attachment-receiving space, the attachment feature having a first attachment surface that extends radially outward from the first outer surface of the heat shield, and a multi-layer coating extending along the primary body surfaces of the heat shield and at least a portion of the first attachment surface of the attachment feature, wherein the first support wall and the second support wall are each formed to define a channel that extends circumferentially at least partway about the axis and opens toward the heat shield of the shroud segment, and wherein the turbine shroud assembly further comprises at least one seal member arranged in each channel to locate the at least one seal member radially between one of the first support wall and the second support wall and the multi-layer coating.

9. The turbine shroud assembly of claim 8, wherein the carrier segment includes an axial locator that extends axially into the attachment-receiving space and engages the multi-layer coating on the first attachment surface of the attachment feature.

10. The turbine shroud assembly of claim 8, wherein the primary body surfaces of the heat shield further comprise a second outer surface spaced apart radially from the inner surface and a second end surface spaced apart axially from the first end surface that extends between and interconnects the inner surface and the second outer surface.

11. The turbine shroud assembly of claim 10, wherein the attachment feature defines a second attachment surface that extends radially outward from the second outer surface of the heat shield, and wherein the multi-layer coating extends up to the second attachment surface of the attachment feature such that the multi-layer coating does not extend over the second attachment surface of the attachment feature.

12. The turbine shroud assembly of claim 10, wherein the attachment feature of the shroud segment includes a forward attachment flange that extends radially outward from the heat shield and a aft attachment flange that extends radially outward from the heat shield and spaced apart axially aft of the forward attachment flange, and wherein the aft attachment flange defines the first attachment surface, and the forward attachment flange defines a second attachment surface that extends radially outward from the second outer surface of the heat shield, and wherein the multi-layer coating extends up to the second attachment surface of the forward attachment flange such that the multi-layer coating does not extend over the second attachment surface of the forward attachment flange.

13. The turbine shroud assembly of claim 8, further comprising a retainer that extends axially into the attachment feature of the shroud segment and the carrier segment to couple the shroud segment to the carrier segment, and wherein the multi-layer coating extends along the portion of the first attachment surface at least up to a minimum line located radially below the retainer.

14. The turbine shroud assembly of claim 13, wherein the multi-layer coating extends along the portion of the first attachment surface up to a point above the minimum line located radially below the retainer and below a maximum line located radially above the minimum line and radially below a top point of the retainer.

15. A method comprising:

providing a carrier segment arranged circumferentially at least partway around an axis, the carrier segment shaped to define an attachment-receiving space and including an axial locator that extends axially into the attachment-receiving space, providing a shroud segment made of ceramic matrix composite materials, the shroud segment comprising a heat shield that extends circumferentially partway around an axis and an attachment feature that extends radially outward from the heat shield, the heat shield having primary body surfaces made up of an inner surface, a first outer surface spaced apart radially from the inner surface, a first end surface that extends between and interconnects the inner surface and the first outer surface, and the attachment feature having a first attachment surface that extends radially outward from the first outer surface of the heat shield, applying a multi-layer coating to the primary body surfaces of the heat shield and at least a portion of the first attachment surface of the attachment feature, machining a portion of the multi-layer coating on the portion of the first attachment surface of the attachment feature before arranging the attachment feature of the shroud segment in the attachment-receiving space of the carrier segment, arranging the attachment feature of the shroud segment in the attachment-receiving space of the carrier segment so that the axial locator of the carrier segment engages the multi-layer coating on the first attachment surface of the attachment feature, and wherein the axial locator engages the machined portion of the multi-layer coating on the portion of the first attachment surface of the attachment feature.

* * * * *